US008139386B2

(12) United States Patent
 Klein

(10) Patent No.: US 8,139,386 B2
(45) Date of Patent: Mar. 20, 2012

(54) MEMORY, COMPUTING SYSTEM AND METHOD FOR CHECKPOINTING

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 1003 days.

(21) Appl. No.: 12/106,838

(22) Filed: Apr. 21, 2008

(65) Prior Publication Data

US 2009/0265504 A1 Oct. 22, 2009

(51) Int. Cl.
*G11C 5/02* (2006.01)
(52) U.S. Cl. ...... 365/51; 365/52; 711/100; 711/E12.001
(58) Field of Classification Search ............ 365/51, 365/52; 711/100, E12.001
See application file for complete search history.

(56) References Cited

U.S. PATENT DOCUMENTS

| 2004/0016390 A1* | 1/2004 | McMillan ............ 116/212 |
| 2005/0289535 A1* | 12/2005 | Murray et al. ........... 717/172 |
| 2007/0088977 A1* | 4/2007 | Eguchi et al. ............ 714/6 |
| 2008/0010435 A1* | 1/2008 | Smith et al. ............ 712/10 |
| 2008/0073758 A1* | 3/2008 | James ............... 257/666 |

* cited by examiner

*Primary Examiner* — Hoai V Ho
(74) *Attorney, Agent, or Firm* — Dorsey & Whitney LLP

(57) ABSTRACT

Embodiments of the present invention provide local checkpoint memories that are closely coupled to the processor of a computing system used during normal operation. The checkpoint memory may be coupled to the processor through a peripheral bus or a memory bus. The checkpoint memory may be located on a same semiconductor substrate or circuit board as the processor. The checkpoint memory may be located on a same semiconductor substrate as a main memory used by the processor during normal operation. The checkpoint memory may be included in a memory hub configuration, with a checkpoint memory hub provided for access to the checkpoint memory.

24 Claims, 5 Drawing Sheets

MEMORY, COMPUTING SYSTEM AND METHOD FOR CHECKPOINTING

TECHNICAL FIELD

This invention relates to checkpoint memory used in computing systems.

BACKGROUND OF THE INVENTION

Massively parallel systems, such as supercomputing systems, use checkpoints to allow the system to recover from a failure. The system stores its state information as checkpoint data so that when and if a failure occurs, the system can be restarted at the checkpoint by loading the checkpoint data. Checkpoints are needed in supercomputing systems because the systems are so large and application runtimes so long (often days or weeks), that restarting at the beginning of a process after an error would be unacceptable.

Checkpoint data is usually stored on rotating magnetic media. The rotating magnetic media has relatively slow input/output bandwidth, located across a remote network from the computing system. Accordingly, the creation of checkpoints, which can include modification of prior checkpoints, involving the storage of the system's state information, consumes an unacceptable amount of machine time, possibly as much as 25 percent of the machine time in some cases. As the computing systems become more sophisticated and expensive, spending this much time checkpointing is unacceptable.

An example of a checkpointing system 10 is shown in FIG. 1. One or more processors, such as CPU 20, include or are in communication with a bus controller 22 and memory controller 24. The CPU 20, bus controller 32 and memory controller 24 can be on a same circuit board or package, and can even be fabricated on a same substrate. The memory controller 24 communicates over memory bus 40 with main memory devices 42, 43, 44, 45, located on a second package or substrate. These main memory devices store data used by the CPU 20 during normal operation of the system 10.

The bus controller 22 may communicate with other units over a communication interface 26. The bus controller 22 also coupled to a peripheral bus 30. The peripheral bus 30 can be located on the same substrate as the CPU 20, bus controller 22 and memory controller 24. Input and output devices 32, 34 are coupled to the peripheral bus 30 for communication with the bus controller 32.

A storage controller 50 is also coupled to the peripheral bus 30. The storage controller 50 communicates over a network 52 with a remote controller 54 to the checkpointing memory contained in a storage system 56. Accordingly, checkpoint memory in the system 10 is physically remote (often feet or miles away) from the CPU 20 and connects through a network 52, such as a LAN. Access to and from the checkpoint memory is accordingly slow and cumbersome.

Checkpoints are also created in systems that process both classified and unclassified information. A checkpoint can be created before switching from a classified context to an unclassified context. Access to the checkpoint data is then disabled prior to switching to the unclassified context. The checkpoint data is later reloaded when classified processing resumes. A reverse procedure occurs when switching from unclassified to classified processing.

As processors become increasingly complex and fast, checkpointing will likely become desirable in servers and even personal computers.

Accordingly, there is a need for a checkpoint memory that can quickly store checkpoint data such that checkpointing does not consume an undue amount of computing time.

DETAILED DESCRIPTION

One or more embodiments of the present invention provide local checkpoint memories that are closely coupled to a processor of a computing system used during normal operation. Data may then be routed to the local checkpoint memory without going through an external network. The checkpoint memory may be coupled to the processor through a peripheral bus or a memory bus. The checkpoint memory may be located on a same semiconductor substrate or carried by a same printed circuit board as the processor. The checkpoint memory and processor may be mounted on the same printed circuit board, or mounted on separate boards that are in turn mounted to a same printed circuit board. The checkpoint memory may be carried by a same circuit board or located on a same semiconductor substrate as a main memory used by the processor during normal operation. The checkpoint memory may be included in a memory hub configuration, with a checkpoint memory hub provided for access to the checkpoint memory. The checkpoint memory may be physically stacked on the main memory. Checkpoint memory configurations provided by embodiments of the present invention can operate at higher speed than the conventional magnetic media used to store checkpoint data. In some embodiments, the checkpoint memory provided takes advantage of the speed and persistence time tradeoff in designing memories. The checkpoint memory may have increased speed at the cost of having a higher leakage rate. The checkpoint memory therefore may have a low persistence time. Some embodiments of checkpoint memories provided have a persistence time between one and two minutes. This may allow a higher speed memory to be used. Although the checkpoint memory is leaky with a low persistence time, the persistence time is long enough in some embodiments to retain the checkpoint data for the time required by the computing system.

Local checkpoint memories are provided in embodiments of the present invention that may be placed in close proximity, fewer than miles in some embodiments, and fewer than feet in other embodiments, to the processor of a computing system. By using local checkpoint memories, checkpoint memory requests in some embodiments do not travel through a network, such as an Internet, LAN, WAN or other remote communication protocol.

Figure 1:
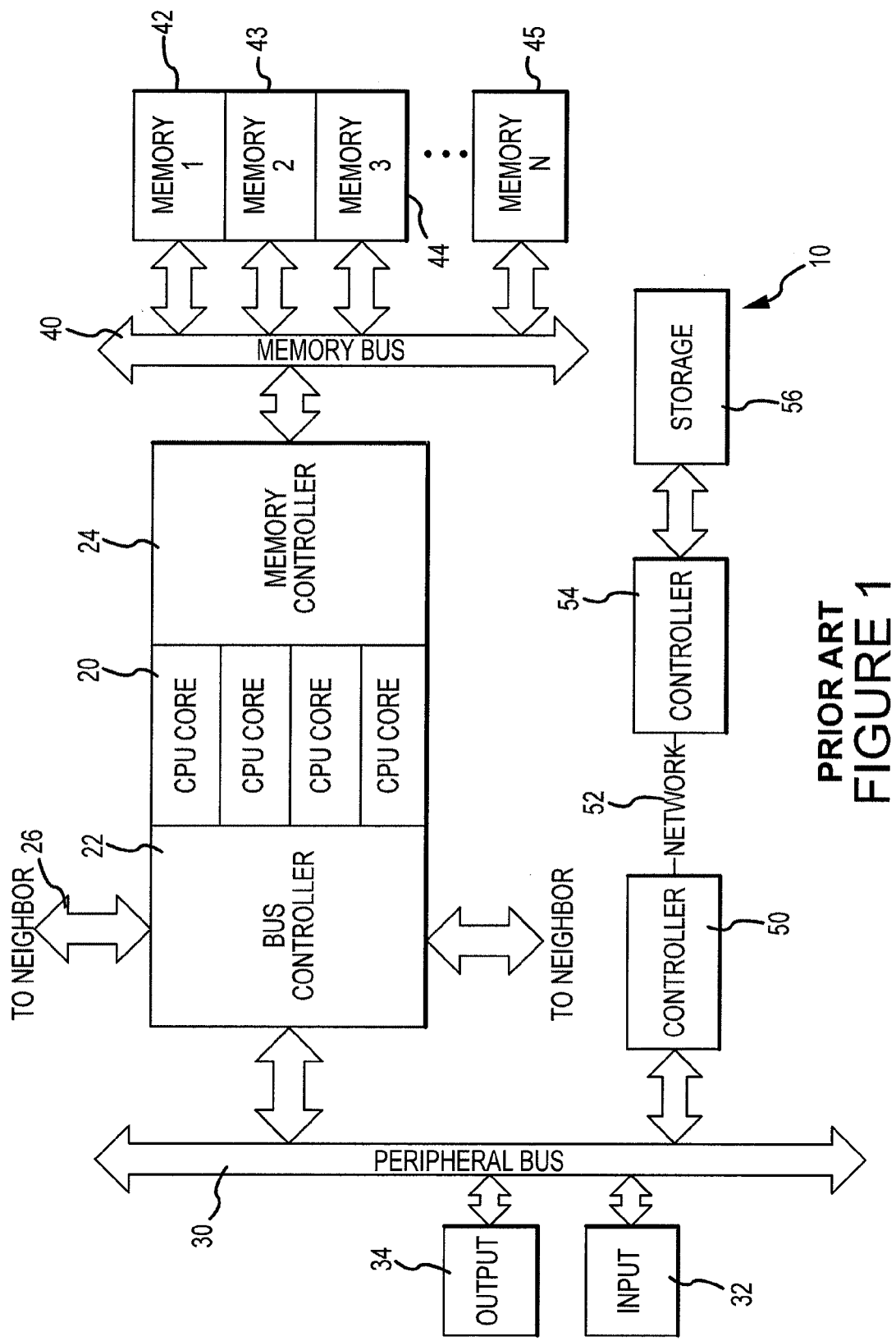
FIG. 1 is a schematic depiction of a computing system according to the prior art.
Figure 2:
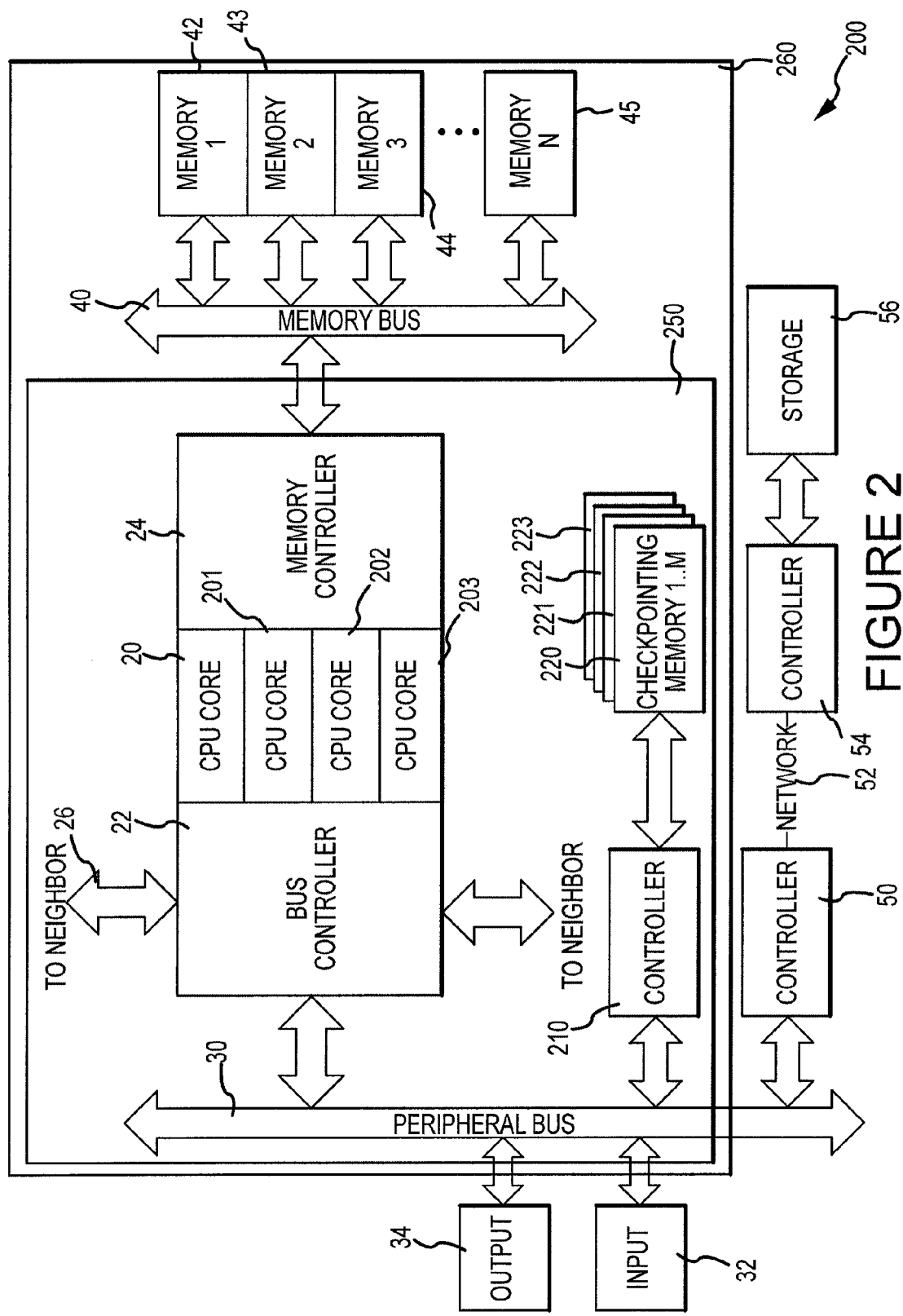
FIG. 2 is a schematic depiction of a computing system according to an embodiment of the present invention.

An embodiment of a system 200 according to an embodiment of the present invention is shown in FIG. 2. The processor 20 provides computational power to the system 200. In some embodiments, a supercomputing system is used with many processors running in parallel. Four processor cores—20, 201, 202 and 203—are shown in FIG. 2. Like elements in FIG. 2 are labeled with like references numbers with respect to FIG. 1, however the configuration of one or more physical elements with like reference numbers may be different between FIGS. 1 and 2 in order to accommodate the system 200 configuration shown in FIG. 2. The processor 20 is in communication with main memories 42, 43, 44, 45 during normal operation through the memory bus 40. The main memory is used to provide data to and receive data from the processor during normal operation, and generally any kind, number and size of main memory may be used. The processor 20 is further coupled to the peripheral bus 30 through the bus controller 22, and the peripheral bus may communicate with one or more input devices 32 and/or one or more output devices 34, such as hard drives, solid-state drives, optical drives, keyboards, displays, mice, other storage devices or processors and the like.

A checkpoint controller 210 is coupled to the peripheral bus 30 and the checkpoint memory 220. A plurality of checkpoint memories 220, 221, 222, 223 are shown in FIG. 2, however any number may be used and any type of memory may be used as checkpoint memory. One or more of the checkpoint memories 220, 221, 222 and 223 store checkpoint data generated by one or more of the processors 20, 201, 202 and 203. The checkpoint controller 210 and one or more of the checkpoint memories 220, 221, 222, 223 may be carried by a same circuit board 250 as one or more of the processors 20, 201, 202 and 203. One or more of the checkpoint memories 220, 221, 222, 223 may be disposed in a same housing 260 as one or more of the processors 20, 201, 202, 203 and/or one or more of the main memories 42, 43, 44, 45. The housing may include, for example, a package, case, or the like. One or more of the checkpoint memories 220, 221, 222, 223 may be mounted on the same circuit board 250 as one or more of the processors 20, 201, 202 and 203. In some embodiments, one or more of the checkpoint memories are mounted on a different circuit board as one or more of the processor cores, and the respective circuit boards in turn mounted on a same circuit board 250. The bus controller 22 and memory controller 24 may also be located on the circuit board 250. The peripheral bus 30 connects the checkpoint controller 210 and checkpoint memories with the bus controller 22 and processors.

In other embodiments, the peripheral bus 30 can be fabricated on a same semiconductor substrate as one or more of the processors 20, 201, 202 and 203 and the bus controller 22. The checkpoint memories 220-223 and the checkpoint controller may also be located on the same semiconductor substrate as the peripheral bus 30.

By providing checkpoint memories on a same circuit board or same semiconductor substrate, embodiments of the present invention may improve the speed of storing and retrieving checkpoint data.

Computing systems according to one or more embodiments of the present invention store checkpoint data from time to time in one or more of the checkpoint memories, such as checkpoint memories 220, 221, 222 and 223 in FIG. 2. The checkpoint data may include computing system state information. The computing system state information may include the processor state, memory state or other information such as contents of registers contained in the computing system. By storing the checkpoint data, the computing system can later reload the checkpoint data and restart a computational task from the point of the checkpoint, without having to return to the beginning of the task.

The time between checkpoints will depend on the task and particular computing system involved. In some embodiments, a checkpoint will be periodically taken. In other embodiments, a checkpoint will be taken at certain benchmarks within a task, or at certain events, such as switching between classified and unclassified mode. Generally, checkpoint data need only be stored long enough to be valid at the time the next checkpoint is taken. The second checkpoint data can overwrite the first, and the first checkpoint is no longer needed. In some embodiments, however, two, three, four, five or more checkpoints are stored to recover from an error that may not have been noticed until several checkpoints had elapsed.

Referring back to FIG. 2, because checkpoint data in some embodiments need only be stored until the next checkpoint is taken, the checkpoint memory 220, 221, 222, and/or 223 is only required to store data for that time. As will be appreciated by those skilled in the art, memory devices tradeoff between speed and persistence time. A faster memory may be leaky in that a short, high speed, low current pulse may be used to set memory cells, but the data is then stored in the memory cell for a temporary time determined by the leakage on that cell. Accordingly, memory cells having a short persistence time may be used in embodiments of checkpoint memories. The persistence time of the memory cells used may correspond to the time for checkpoint data to be retained by the computing system. In some embodiments, memory cells having a persistence time on the order of hours may be used. In other embodiments, memory cells having a persistence time on the order of minutes may be used. In some embodiments memory cells included in checkpoint memories have a persistence time of between 1 and 2 minutes. By only requiring a short persistence time, faster memory cells may be used in the checkpoint memories.

Embodiments of checkpoint memories, such as memories 220, 221, 222, and 223 in FIG. 2, may be generally any kind of memory known in the art including DRAM, NOR flash or NAND flash memory. In some embodiments, silicon-oxide-nitride-oxide-silicon (SONOS) based memory cells are used. In other embodiments, low-voltage floating gate memory cells are used. In some other embodiments, memory cells capable of storing multiple bits per cell are used.

Figure 3:
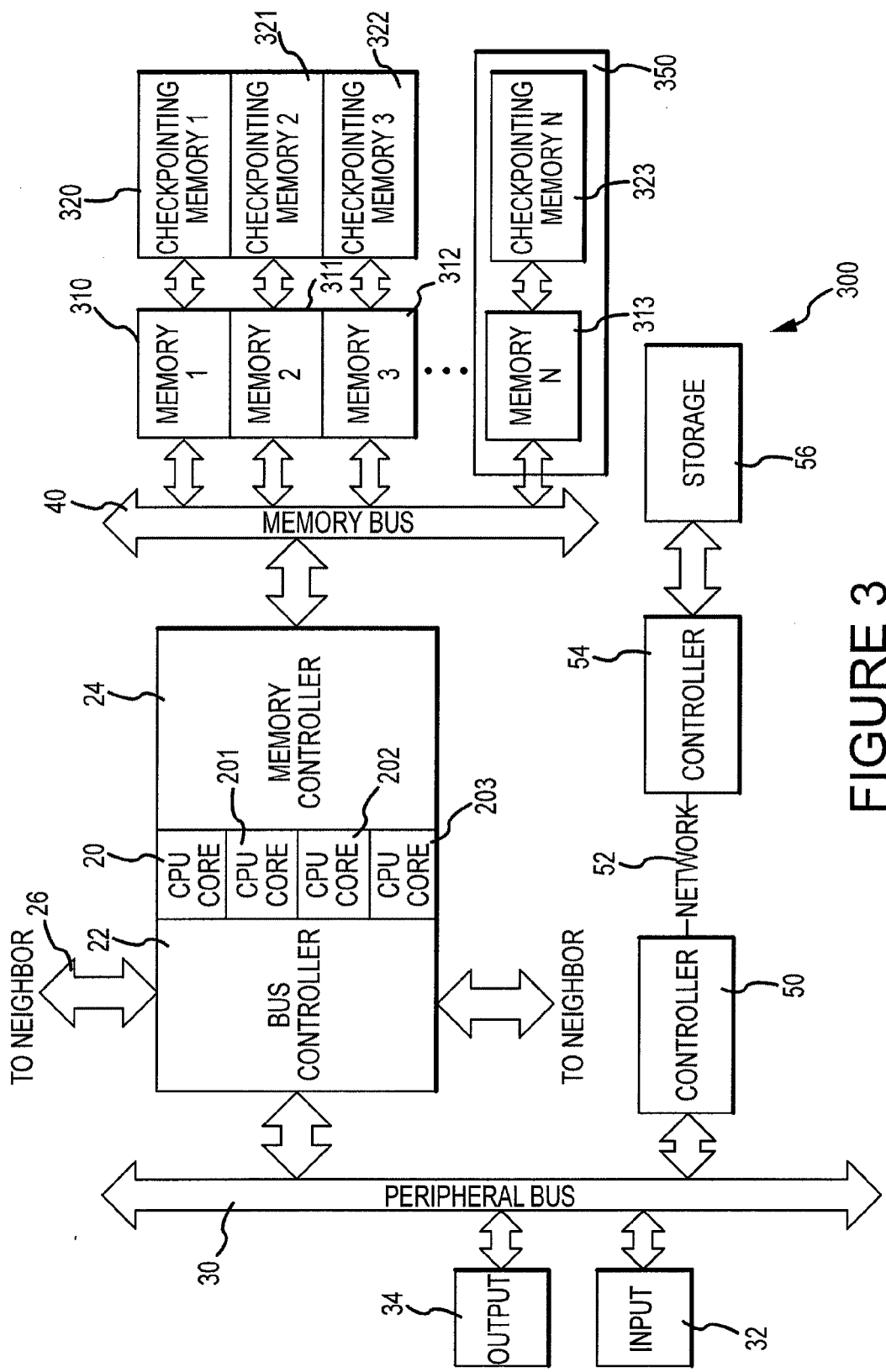
FIG. 3 is a schematic depiction of a computing system according to an embodiment of the present invention.

A system 300 according to another embodiment of the present invention is shown in FIG. 3. The system 300 provides checkpoint memories 320, 321, 322 and 323 coupled to main memory devices 310, 311, 312 and 313, respectively. Each checkpoint memory may be carried by a same circuit board or a same semiconductor substrate as its respective main memory device, such as main memory 313 and checkpoint memory 323, shown in FIG. 3 located on a same circuit board or semiconductor substrate 350. The memory 313 and the checkpoint memory 323 may be mounted on a same printed circuit board or mounted on different circuit boards that are in turn mounted on a same circuit board. In some embodiments, one or more of the checkpoint memories 320, 321, 322 and 323 may be physically stacked on their respective main memory device. Requests from one or more of the processors 20, 201, 202 and 203 are transmitted to the main memory devices and the checkpoint memory devices over the memory bus 40 using the memory controller 24. By locating the checkpoint memories locally with the main memory, memory access speed may be improved. The checkpoint memories 320, 321, 322 and 323 may now be accessed by the memory bus 40 in parallel, which can improve the bandwidth of checkpointing. The amount of checkpoint memory included in the system 300 may vary according to the size and number of checkpoints desired to be retained. In some embodiments, the amount of checkpoint memory provided is equal or greater to the amount of main memory.

Figure 4:
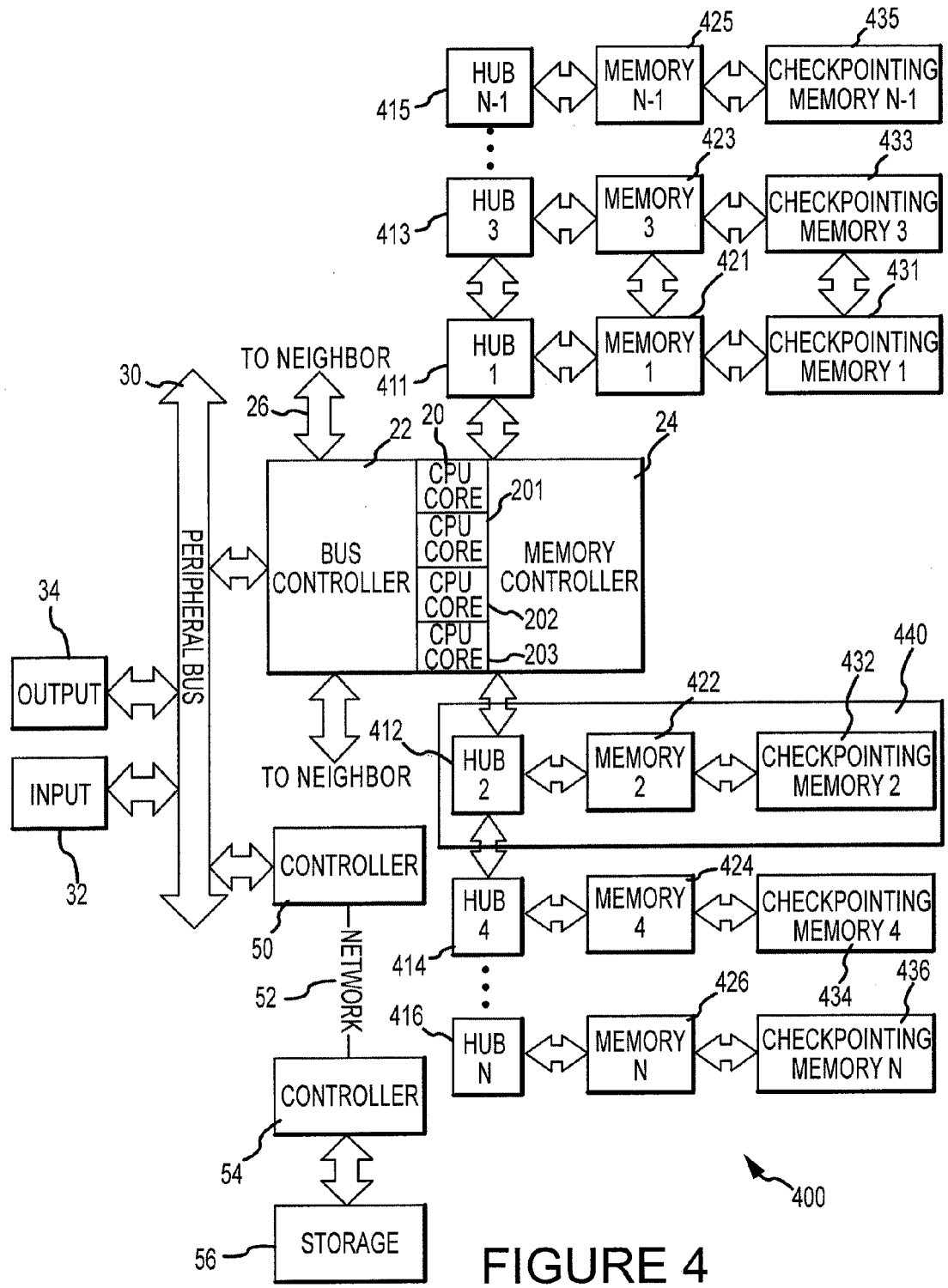
FIG. 4 is a schematic depiction of a computing system according to an embodiment of the present invention.

System 400 according to another embodiment of the present invention employing hub-based checkpointing is shown in FIG. 4. Rather than using a memory bus 40, as in FIG. 3 to communicate between the memory controller 24 and the main and checkpoint memories, the system 400 utilizes one or more memory hubs to access the main memories and checkpoint memories. Hubs 411, 412, 413, 414, 415 and 416 are provided to access at least one respective main memory device and checkpoint memory. For example, in FIG. 4, memory hub 411 routes requests from the memory controller 24 to the main memory 421 and the checkpoint memory 431, and from those memories back to the memory controller 24. The memory hub 412 routes requests from the memory controller 24 to the main memory 422 and the checkpoint memory 432, and from those memories back to the memory controller. Each memory hub may be located on a same circuit board or semiconductor substrate as its respective main memory and checkpoint memory. For example, the memory hub 412, main memory 422 and checkpoint memory 432 are located on semiconductor substrate 440. As described above, placing checkpoint memory in close proximity to main memory can improve the time needed to store and retrieve checkpoints.

Figure 5:
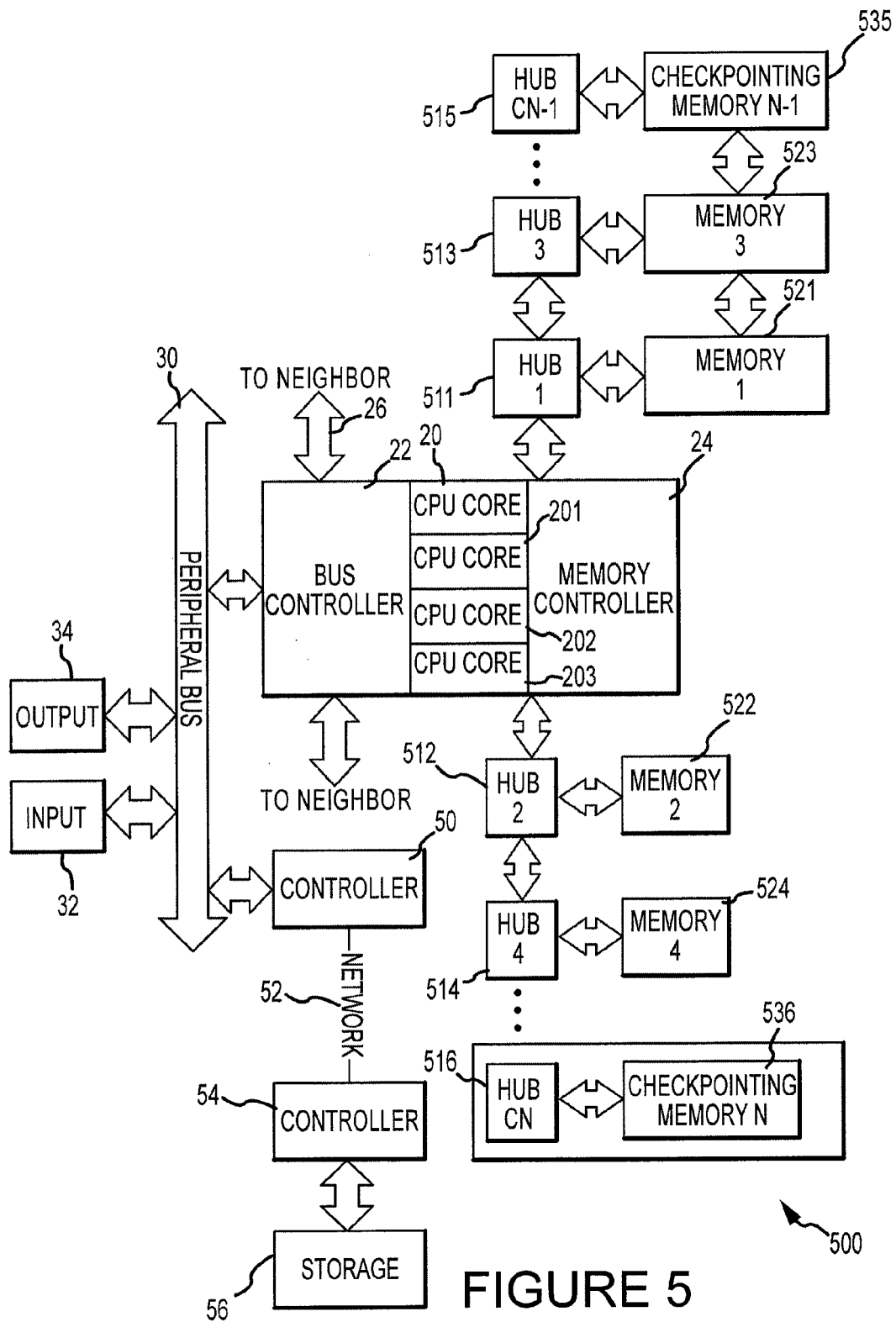
FIG. 5 is a schematic depiction of a computing system according to an embodiment of the present invention.

A system 500 according to another embodiment of the present invention employing a memory hub configuration is shown in FIG. 5. Instead of associating a checkpoint memory and a main memory device with a single memory hub, as in system 400 in FIG. 4, the system 500 shown in FIG. 5 provides memory hubs 511, 512, 513 and 514 to access main memory devices 521, 522, 523 and 524, respectively. Checkpoint memory hubs 515 and 516 are provided to access checkpoint memories 535 and 536, respectively. Each main memory or checkpoint memory may be located on a same semiconductor substrate as their corresponding memory hub. For example, the checkpoint memory hub 516 and the checkpoint memory 536 are located on semiconductor substrate 540. Speed of checkpointing may increase in the system 500 at least because memory requests are passed over a memory hub interface, and not through a network, such as the network 52. Memory hub slots should be filled or the checkpointing hubs 516 and 515 be placed at an end of the chain of memory hubs in system 500.

From the foregoing it will be appreciated that, although specific embodiments of the invention have been described herein for purposes of illustration, various modifications may be made without deviating from the spirit and scope of the invention.

What is claimed is:

1. A computing system comprising:
a processor;
a peripheral bus;
a main memory coupled to the processor for use during normal operation of the computing system;
the processor configured to develop checkpoint data including computing system state information; and
a checkpoint memory configured to store the checkpoint data; and
a printed circuit board, the checkpoint memory and at least one of the main memory and the processor carried by the printed circuit board,
wherein the checkpoint memory, the processor, and the peripheral bus are located on a semiconductor substrate.

2. The computing system of claim 1 wherein the checkpoint memory and the main memory are located on the semiconductor substrate.

3. The computing system of claim 2, the computing system further comprising:
a bus controller coupled to the processor, wherein the peripheral bus is coupled to the checkpoint memory, the peripheral bus configured to receive checkpoint data and transmit the checkpoint data to the checkpoint memory.

4. The computing system of claim 3 wherein the checkpoint data is for use in recovery from an error.

5. The computing system of claim 2, the system further comprising:
a memory controller coupled to the processor;
a memory bus, the memory controller configured to transmit data to the main memory over the memory bus and to transmit checkpoint data to the checkpoint memory over the memory bus.

6. The computing system of claim 2, the system further comprising:
a memory controller coupled to the processor;
at least a first memory hub located on the semiconductor substrate and configured to route data from the memory controller to the main memory and the checkpoint memory.

7. The computing system of claim 1 wherein the checkpoint memory is physically stacked on the main memory.

8. The computing system of claim 1 wherein the checkpoint data is required to be valid for a required time based on the computing system, the checkpoint memory further comprising a plurality of memory cells, each of the plurality of memory cells having a persistence time corresponding to the required time.

9. The computing system of claim 8 wherein the persistence time is between one and two minutes.

10. The computing system of claim 1 wherein the checkpoint memory comprises a plurality of low-voltage floating gate memory cells.

11. The computing system of claim 1 wherein the computing system state information includes processor information and main memory information.

12. The computing system of claim 1, wherein the computing system state information includes data corresponding to at least two checkpoints.

13. The computing system of claim 1 wherein the processor comprises a plurality of parallel processors coupled to the main memory and the checkpoint memory.

14. A computing system comprising:
a processor;
a memory controller;
a main memory coupled to the processor for use during normal operation of the computing system,
the processor configured to develop checkpoint data including computing system state information;
a checkpoint memory configured to store the checkpoint data
a first memory hub coupled to the memory controller and configured to route first signals from the memory controller to the main memory; and
a checkpoint memory hub coupled to the memory controller and configured to route second signals from the memory controller to the checkpoint memory.

15. The computing system of claim 14 wherein the computing system state information is for use in recovery from an error.

16. A method for checkpointing in a computer system, the method comprising:
providing memory signals to a main memory through a main memory hub;
developing checkpoint data including computer system state information;

routing the checkpoint data through a checkpoint memory hub to a local checkpoint memory without going through a network; and storing the checkpoint data in the local checkpoint memory.

17. The method for checkpointing according to claim 16 further comprising:

determining an error has occurred; and retrieving the checkpoint data from the checkpoint memory responsive to the error determination.

18. The method for checkpointing according to claim 16 wherein the act of routing the checkpoint data to the checkpoint memory comprises:

coupling the checkpoint data onto a peripheral bus; and coupling the checkpoint data directly from the peripheral bus to the checkpoint memory.

19. The method for checkpointing according to claim 18 wherein the act of coupling the checkpoint data directly includes maintaining the checkpoint data on at least one of a same circuit board and semiconductor substrate as the peripheral bus.

20. The method for checkpointing according to claim 16 wherein the act of routing the checkpoint data to the checkpoint memory comprises:

coupling the checkpoint data onto a memory bus, the memory bus configured to access a main memory during normal operation; and coupling the checkpoint data from the memory bus to the checkpoint memory.

21. The method for checkpointing according to claim 16 wherein the act of routing the checkpoint data to the checkpoint memory comprises:

coupling the checkpoint data to a first memory hub, the first memory hub configured to access a main memory during normal operation and to access the checkpoint memory when the checkpoint data is received.

22. The method for checkpointing according to claim 16 wherein the act of routing the checkpoint data to the checkpoint memory comprises:

coupling the checkpoint data to a memory hub configured to access the checkpoint memory.

23. The method for checkpointing according to claim 16 wherein the act of routing the checkpoint data to the checkpoint memory occurs after a certain event.

24. The method for checkpointing according to claim 23 wherein the certain event includes a switch from a classified mode for the computing system to an unclassified mode for the computing system.

\* \* \* \* \*